United States Patent
Kunugihara

(10) Patent No.: US 7,223,467 B2
(45) Date of Patent: May 29, 2007

(54) BIAXIALLY ORIENTED LAMINATED POLYESTER FILM

(75) Inventor: Kazuhiro Kunugihara, Maihara (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 0 days.

(21) Appl. No.: 10/537,021

(22) PCT Filed: Sep. 22, 2003

(86) PCT No.: PCT/JP03/12078

§ 371 (c)(1),
(2), (4) Date: Dec. 1, 2005

(87) PCT Pub. No.: WO2004/050364

PCT Pub. Date: Jun. 17, 2004

(65) Prior Publication Data

US 2006/0154094 A1    Jul. 13, 2006

(30) Foreign Application Priority Data

Dec. 2, 2002    (JP) ............... 2002-349614

(51) Int. Cl.
    B32B 27/06    (2006.01)
    B32B 27/08    (2006.01)
    B32B 27/18    (2006.01)
    B32B 27/36    (2006.01)

(52) U.S. Cl. ............ 428/328; 428/323; 428/447; 428/480; 428/483; 428/910; 524/401; 524/408; 524/409; 524/410; 524/413; 524/430; 359/350; 359/359; 359/361

(58) Field of Classification Search ............ None
See application file for complete search history.

(56) References Cited

U.S. PATENT DOCUMENTS

| | | | | |
|---|---|---|---|---|
| 3,644,270 A | * | 2/1972 | Valiaveedan ............ | 524/717 |
| 5,747,152 A | * | 5/1998 | Oka et al. ............ | 428/323 |
| 5,925,438 A | * | 7/1999 | Ota et al. ............ | 428/141 |
| 6,033,743 A | * | 3/2000 | Suzuki et al. ............ | 428/1.31 |
| 6,146,953 A | * | 11/2000 | Lee et al. ............ | 438/289 |
| 6,207,263 B1 | * | 3/2001 | Takematsu et al. ......... | 428/220 |
| 6,319,594 B1 | * | 11/2001 | Suzuki et al. ............ | 428/208 |
| 6,319,613 B1 | * | 11/2001 | Takeda et al. ............ | 428/412 |
| 6,376,060 B1 | * | 4/2002 | Yoshihara et al. ......... | 428/323 |
| 6,503,627 B1 | * | 1/2003 | Niimi et al. ............ | 428/409 |
| 6,787,236 B2 | * | 9/2004 | Kimura et al. ............ | 428/412 |
| 6,879,438 B2 | * | 4/2005 | Masuda ............ | 359/359 |
| 2002/0064650 A1 | * | 5/2002 | Masuda ............ | 428/336 |
| 2003/0016442 A1 | * | 1/2003 | Masuda ............ | 359/359 |

FOREIGN PATENT DOCUMENTS

| | | | | |
|---|---|---|---|---|
| EP | 338 434 A | * | 10/1989 |
| EP | 795 565 A | * | 9/1997 |
| EP | 1 179 421 A | * | 2/2002 |
| JP | 08-230126 A | * | 9/1996 |
| JP | 10-157040 A | * | 6/1998 |
| JP | 2000-006345 A | * | 1/2000 |
| JP | 2000-198175 A | * | 7/2000 |
| JP | 2002-052676 A | * | 2/2002 |
| JP | 2002-210855 A | * | 7/2002 |

* cited by examiner

*Primary Examiner*—Vivian Chen
(74) *Attorney, Agent, or Firm*—Edwards Angell Palmer & Dodge LLP; David G. Conlin; Mark D. Russett

(57) ABSTRACT

A biaxially oriented laminated polyester film which is a co-extruded laminated polyester film comprising at least three polyester layers with the intermediate layer containing a dye which is substantially dissolved in polyesters, said film having on one side thereof a resin layer containing metal-added metal oxide particles or metal oxide particles. This film is capable of preventing precipitation of the dye on the film surface, excels in heat insulation and aesthetic effect in use, and is suited for application to windows.

7 Claims, No Drawings

BIAXIALLY ORIENTED LAMINATED POLYESTER FILM

CROSS-REFERENCE TO RELATED APPLICATION(S)

This application is a §371 application of copending international patent application PCT/JP03/12078 which was filed on Sep. 22, 2003, which is incorporated by reference.

TECHNICAL FIELD

The present invention relates to a biaxially oriented polyester film suited for window application, which is used by sticking it on glass such as windows of automobiles and architectural structures. More particularly, the invention pertains to a biaxially oriented polyester film suited for application to windows, which is capable of preventing precipitation of dye on the film surface and excels in heat insulation and aesthetic effect in use.

BACKGROUND ART

Polyester films having excellent transparency, light resistance, water resistance, heat resistance, chemical resistance and mechanical strength are popularly used as films for window application films, which are applied (stuck) on the windows of automobiles, buildings, etc., for the purpose of protection of privacy, impartation of aesthetic effect, adjustment of the sunshine, prevention of scattering of glass pieces in the event of accidental break of glass, etc.

Use of a laminated polyester film having three or more layers containing a dye in the intermediate layer has been proposed as a light-shielding film for windows (Japanese Patent No. 2,699,397 and Japanese Patent Application Laid-Open (KOKAI) No. 8-174750).

In application of these light-shielding films to the windows of automobiles or buildings, their heating insulating effect is found unsatisfactory as they allow passage of light of long wavelength from the sun. Also, the films obtained by depositing a metal on the light-shieldable films are well known, but these films involve the problems that in long time use, the dye or pigment blended for providing the light shielding properties could separate out on the film surface, or transparency is deteriorated by metal deposition.

The present invention has been attained in view of the above circumstances, and its object is to provide a biaxially oriented polyester film suited for window application, which is capable of preventing separation of the dye on the film surface and excels in heat insulation and aesthetic effect in use.

DISCLOSURE OF THE INVENTION

In view of the above circumstances, the present inventors have pursued their studies and found that the above problems could be solved by laminating a specific layer on a light-shielding film having a specific laminated structure. The present invention has been attained on the basis of the above finding.

In an aspect of the present invention, there is provided a biaxially oriented laminated polyester film which is a co-extruded laminated film comprising at least three polyester layers whose intermediate layer containing a dye which is substantially dissolved in the polyesters, said film having on one side thereof a resin layer containing metal-added metal oxide particles or metal oxide particles.

The present invention will be described in further detail hereinbelow.

The biaxially oriented polyester film according to the present invention is a film comprising at least three laminated polyester layers. More specifically, it is a film produced by a so-called coextrusion method in which all of the layers are melt extruded simultaneously from the diehead of the extruder. Also, the film is not in a non-stretched or monoaxially stretched state but is stretched and oriented in two axial directions, viz. in both machine and transverse directions, and then heat set. Such a laminated film has the coextruded surface layers on both sides, holding a coextruded intermediate layer therebetween. This intermediate layer itself may be of a laminate structure.

A polyester film of a single layer structure tends to suffer from such phenomena as bleeding (migration of the contained dye onto the film surface in use) and sublimation of the bleedout. Such phenomena contribute to contamination of the film forming machine, resulting in many cases in making it unable to carry on the film forming operation. Even if a film could be formed, it has bleedout on its surface layer, which tends to give adverse effect to the ensuing works.

The polyester used for the laminated layers in the polyester film of the present invention can be obtained by polycondensing an aromatic dicarboxylic acid and an aliphatic glycol. Terephthalic acid, 2,6-naphthalenedicarboxylic acid and the like can be used as the aromatic dicarboxylic acid, and ethylene glycol, diethylene glycol, 1,4-cyclohexanedimethanol and the like can be used as the aliphatic glycol. Typical examples of the polyesters usable in the present invention are polyethylene terephthalate (PET) and polyethylene-2,6-naphthalene dicarboxylate (PEN), the former being especially preferred because of a good balance of properties and cost.

The polyester used in the present invention may be a copolymer containing a third component(s) provided that the overall amount of such third component(s) is not more than 10 mol %, preferably not more than 5 mol %. The dicarboxylic acid moiety of the copolymer polyester may comprise one or more of isophthalic acid, phthalic acid, terephthalic acid, 2,6-naphthalenedicarboxylic acid, adipic acid, sebacic acid, oxycarboxylic acid (such as p-oxybenzoic acid) and the like, and the glycol moiety may comprise one or more of ethylene glycol, diethylene glycol, propylene glycol, butanediol, 1,4-cyclohexanedimethanol, neopenthyl glycol and the like.

In the biaxially oriented polyester film according to the present invention, it is essential that a dye be contained in the inside layers (intermediate layers) of the laminated film, the said dye being the one which can be substantially dissolved in polyesters. The expression "substantially dissolved" used here means that when the dye is mixed and kneaded with a polyester in its molten state, they are uniformly mixed up without leaving any aggregates. Also, the dye used in the present invention is preferably the one which has absorption in the visible light region (380–780 nm) and is minimized in decomposition at the polyester molding temperature. From the viewpoint of chemical structure, preferred examples of the said dye are anthraquinone dyes, perinone dyes, perillene dyes, azomethine dyes and heterocyclic dyes, but disperse dyes and oil-soluble dyes are advantageous in terms of dye formulation. The materials which are generally classified as pigments are also usable as dye in the present invention if they can be dissolved in the molten polyester as mentioned above. Examples of such materials are the complex salts of phthalocyanine pigments with metallic ions such as copper, cobalt, nickel, zinc and chromium ions.

Usually several types of the said dyes are properly selected and mixed for providing a desired color tinge such as gray or brown tint. The content of the dyes in the polyester may be properly selected from the range of usually 0.01 to 10.0% by weight, preferably 0.05 to 5.0% by weight.

In the biaxially oriented polyester film for window application according to the present invention, radical trapping agent and/or other additives may be allowed to exist with the said dyes in the coextruded intermediate layer, but their addition would be confined within limits not causing cloudiness of the film and keeping the haze in the following-defined range.

As means for incorporating a dye (or dyes) and other additives in the base polyester in the present invention, a method may be used in which they are added in the form of powder, paste or liquid when a film is melt molded, but in view of the problem of contamination of the apparatus and ease of change of formulation, it is preferable to use a method in which a master batch of the dye(s) and other base materials is prepared first and this master batch is added while being diluted with a clear resin in the course of melt molding of a film. In this melt molding operation, it is preferable to use a double-screw extruder for performing the operation while conducting mixing with good dispersion in the polyester.

In the polyester film of the present invention, in order to provide appropriate slipperiness of the external layer surface, there may be contained the fine particles of a size and amount sufficient to allow formation of fine protrusions on the coextruded surface layers on both sides. As such fine particles, it is possible to use, for example, one or a mixture of two or more of powdered silicon oxide, calcium carbonate, kaolin and crosslinked organic polymers having an average size of 0.02 to 5.0 µm. The amount of such fine particles to be added is properly selected from the range of 0.001 to 0.5% by weight, preferably 0.01 to 0.1% by weight, as this range of amount makes it possible to provide the minimum necessary slipperiness without increasing the film haze. The film is allowed to have an average surface roughness Ra of preferably 0.005 to 0.050 µm by containing the said particles.

Further, in the polyester forming the coextruded surface layers, known additives such as infrared absorber, ultraviolet absorber, etc., may be contained in the amounts within limits not exceeding the concept of the present invention.

Regarding the thickness of the coextruded surface layers and intermediate layer, the coextruded surface layers containing the fine particles are preferably as small in thickness as possible for preventing the film from becoming clouded (increased in haze) as a whole. On the other hand, the coextruded surface layers are rather required to be as large as possible in thickness for preventing bleeding of the dye and other additives present in the intermediate layer. In view of this, usually the thickness of the coextruded surface layer on each side is preferably in the range of 0.5 to 5.0 µm, regardless of the overall thickness of the film. Both surface layers may be the same or different in thickness, but when different, both layers are preferably within the above-specified range of thickness.

The resin layer laminated on one side of the polyester film of the present invention needs to contain metal-added metal oxide particles or metal oxide particles.

Examples of these metal oxide particles include tin-added indium oxide particles (ITO), tin oxide-added indium oxide particles, antimony-added tin oxide particles (ATO), antimony-added zinc oxide particles (AZO), cadmium-added tin oxide particles (CTO), magnesium-added indium oxide particles ($MgIn_2O_4$), cadmium-added gallium oxide particles ($CdGa_2O_4$), zinc-added gallium oxide particles ($ZnGa_2O_4$), indium-added tin oxide particles ($In_4Sn_3O_{12}$), indium oxide-added tin oxide, gallium-added indium oxide particles ($GaInO_3$), zinc-added indium oxide particles ($ZnIn_2O_4$), tin oxide, indium oxide, and zinc oxide.

The metal added to the oxidized metal particles may be an oxide or plural in number. Also, the particles such as mentioned above may be contained alone or as a mixture of two or more types. Among the particles mentioned above, tin-added indium oxide particles (ITO), antimony-added tin oxide particles (ATO) and tin oxide particles are preferred, with ITO being especially preferred in terms of transparency and heat ray shielding effect. Also, these particles may or may not have been calcined. When calcined, the calcination atmosphere may be either of a non-oxygen state (for example, no oxygen state or reduced state) or of an oxygen-existing state, but a non-oxygen state is preferred from the viewpoint of heat ray cut-off performance. The particles may take various shapes such as lump, sphere, ellipsoid, needle, etc. The average particle size is preferably not more than 0.2 µm, more preferably not more than 0.1 µm. When the average particle size exceeds 0.2 µm, the produced film tends to prove low in transparency against visible light rays.

As the resin used for the resin layer containing metal-added metal oxide particles or metal oxide particles which is laminated on one side of the film of the present invention, there can be used one or a combination of two or more of the resins selected from polyester resins, acrylic resins, polyurethane resins, polycarbonate resins, silicon resins, epoxy resins, polystyrene resins, ABS resins, polyvinyl chloride resins, polyvinylidene chloride resins, polyolefin resins, polyamide resins, water-soluble alkyd resins, polyvinyl alcohol resins, polybutyl alcohol resins, polyvinyl butyral resins, polyvinyl acetal resins, vinyl acetate resins and acrylic styrene resins.

The method for blending the metal-added metal oxide particles or the metal oxide particles in the resin layer is not restricted specifically; it is possible to use, for example, the following methods: the particles are added at any proper stage of polymerization of the resin; the particles are directly added to the molten resin; the resin and the particles are dry blended and the blend is melt extruded from an extruder; the particles are added to the resin dissolved or dispersed in a solvent.

The methods of laminating the resin layer will be described concretely below, but the methods available for the purpose are not limited to those described below.

There can be used, for example, a so-called coextrusion method in which by using plural extruders, a polyester and a resin containing the metal-added metal oxide particles are extruded simultaneously, joined in the feed block or diehead, then further extruded and laminated; a so-called extrusion lamination method in which a resin containing the metal-added metal oxide particles or the metal oxide particles is melted by an extruder and directly laminated on a polyester film; a so-called in-line coating (ILC) method in which after casting or monoaxial stretching in the polyester film forming line, a slurry of a resin containing metal-added metal oxide particles or metal oxide particles and dissolved in water or an alcoholic solvent is coated on a polyester film; and an off-line coating (OLC) method in which a resin prepared as a coating material by dissolving it in an organic solvent and containing metal-added metal oxide particles or metal oxide particles is coated on a polyester film.

A method of forming a laminated film by laminating a resin containing metal-added metal oxide particles on a polyester film according to the off-line coating method in the present invention is explained below, but the laminated film of the present invention is not restricted by the following method in any way.

It is possible to obtain a desired laminated film by dispersing the metal-added metal oxide particles in a resin dissolved in an organic solvent to prepare a coating material, applying this coating material on a colored polyester film by a conventional coating method, and drying and solidifying the coat. The coating material may contain ordinarily used additives such as dispersant and coupling agent.

As means for incorporating a dye (or dyes) in the base polyester in the present invention, a method may be used in which they are added in the form of powder, paste or liquid when a film is melt molded, but in view of the problem of contamination of the apparatus and ease of change of formulation, it is preferable to use a method in which a master batch of the dye(s) is prepared first and this master batch is added while being diluted with a clear resin in the course of melt molding of the film. In this melt molding operation, it is preferable to use a double-screw extruder for performing the operation while conducting mixing with good dispersion in the polyester.

In the polyester film of the present invention, in order to provide appropriate slipperiness of the external layer surface, there may be contained the fine particles of a size and amount sufficient to allow formation of fine protrusions on the coextruded surface layers on both sides. As such fine particles, it is possible to use, for example, one or a mixture of two or more of powdered silicon oxide, calcium carbonate, kaolin and crosslinked organic polymers having an average size of 0.02 to 3.0 µm. The amount of such fine particles to be added is properly selected from the range of 0.001 to 0.5% by weight, preferably 0.01 to 0.1% by weight, since this range of amount makes it possible to provide the minimum necessary slipperiness without increasing the film haze. The film is allowed to have an average surface roughness Ra of preferably 0.005 to 0.050 µm by containing the said particles.

Further, in the polyester forming this surface layers, known additives such as ultraviolet absorber, infrared absorber, antistatic agent etc., may be contained in the commonly used amounts.

In the film of the present invention, a dye is added to coexist in the intermediate layer as mentioned above, such a dye being the one which is substantially dissolved in the polyester and capable of maintaining transparency specific to the polyester without causing cloudiness. Therefore, use of a dye which, even though dissoluble per se in polyesters, may cause formation of agglomerates when reacted with other additives is unfavorable. The film of the present invention preferably has both transparency of usually not more than 8.0%, preferably not more than 5.0% in haze of the whole film including the resin layer containing the metal-added metal oxide particles or the metal oxide particles and a light screening performance equivalent to visible light transmittance of usually 3 to 70%, preferably 5 to 50%.

Regarding the thickness of the surface layers and intermediate layer, the surface layers containing the fine particles are preferably as small in thickness as possible for preventing the film from becoming clouded (increased in haze) as a whole. On the other hand, the surface layers are rather required to be as large as possible in thickness for preventing bleeding of the dye and other additives present in the intermediate layer. In view of this, usually the thickness of the surface layer on each side is preferably in the range of 0.5 to 4.0 µm, regardless of the overall thickness of the film.

In the polyester film of the present invention, a known type of heat-curing or ultraviolet-curing hard coat mainly comprising an acrylic or methacrylic acid derivative may be provided on the exposed side of the film for preventing scratches on this side of the film when it is applied to window glass.

This hard coat is not in-line coating but is formed by applying and drying a coating material as a post-work of a biaxially oriented polyester film finished with crystal orientation and usually using an organic solvent. This hard coat can be formed by using a known coating device such as reverse gravure coater, gravure coater, rod coater, air doctor coater, etc.

Since this hard coat is positioned on the exposed side when the film is stuck on a window, this layer preferably has a surface hardness not below "H" in rating by pencil hardness so that it will not scratch easily. Larger thickness of the hard coat is more advantageous for maintaining the surface hardness at or above "H" in terms of pencil hardness. However, since the hard coating material shrinks when cured and this shrinkage gives rise to the problem of curling of the film, smaller thickness of the hard coat is preferred for preventing curling of the film. In order to satisfy these contradictory features at the same time, the thickness (dry thickness) of the hard coat is preferably set to fall within the range of 0.5 to 5.0 µm.

A known sticking agent or adhesive is applied on the film of the present invention for pasting it on window glass. Application of such a sticking agent or adhesive on the film can be effected in the same way as in the case of providing the hard coat—applying and drying a coating material as post-work usually using an organic solvent on the biaxially oriented polyester film finished with orientation crystallization.

A known ultraviolet absorber may be blended in the sticking agent or adhesive, or an infrared absorber may be added in an appropriate amount as practiced in the art. Also, a known plastic film which has been subjected to a release treatment by silicon coating may be pasted as a separator film to the sticking agent or adhesive.

A process for producing the laminated polyester film of the present invention is described below in detail, but the film of the present invention is not restricted by the following exemplification in any way.

First, the respective polyester materials mentioned above are laminated and melt extruded into a multilayered sheet by using plural sets of extruder and a multi-manifold die or feed block, and the enhance is cooled and solidified by the cooling rolls to obtain a non-stretched sheet. In this operation, in order to improve flatness of the sheet, it is preferable to elevate adhesion between the sheet and the rotary cooling drum, for which an electrostatic pinning method and/or a liquid coating adhesion method are preferably used.

The thus obtained non-stretched film is then stretched in the two axial directions to effect biaxial orientation. That is, the non-stretched film is first stretched usually 2.5 to 7 times, preferably 3.0 to 6 times, in the machine direction at usually 70 to 120° C., preferably 80 to 110° C., by a roll stretcher, then further stretched 3.0 to 7 times, preferably 3.5 to 6 times in the transverse direction at usually 70 to 120° C., preferably 80 to 115° C., and successively heat treated at 170 to 250° C. under tension or relaxation of not more than 30% to obtain a biaxially stretched film.

Stretching may be performed either by a method in which the film is stretched to the prescribed ratio by one stretching operation or a method in which the film is stretched in two or more stages until it has the prescribed stretch ratio. In the latter case, too, stretching is preferably conducted so that the stretch ratios in the two directions will finally come within the above-defined ranges. If necessary, the stretched film may be re-stretched in the machine direction and/or in the transverse direction before or after the heat treatment.

In the present invention, as stated above, it is essential to provide an antistatic coating on the surface of at least one side of the film, and especially in case where such an antistatic coating is formed by in-line coating, preferably a coating solution using a water-based solvent is applied on the film surface upon completion of stretching in the machine direction in the above process, and the coated film is dried, pre-heated and stretched transversely by a tenter and then heat set.

This antistatic coating may be formed by using a conventional coating device such as reverse gravure coater, gravure coater, rod coater, air doctor coater, etc.

BEST MODE FOR CARRYING OUT THE INVENTION

The present invention is described in further detail with reference to the embodiments thereof, but it is to be understood that these embodiments are merely intended to be illustrative and not to be construed as limiting the scope of the invention. In the following Examples and Comparative Examples, all "parts" are by weight unless otherwise noted.

The determination methods used in the present invention are as described below.

(1) Film Haze:

Film haze was determined according to JIS-K7105 using a hazeometer NDH300A (mfd. by Nippon Denshoku Industries Co., Ltd.).

(2) Visible light transmittance:

Light transmittance at the specified wavelengths was measured by a spectrocolorimetry SE-2000 (mfd. by Nippon Denshoku Industries Co., Ltd.) using D65 light source, and visible light transmittance was calculated according to JIS S 3107.

(3) Adhesion to Resin Layer Containing Metal Oxide:

A polyurethane-based two-pack curable adhesive comprising 100 parts of "AD-502" and 10 parts of "CAT-10" (both produced by Toyo Morton Co., Ltd.) was coated on the surface of a resin layer containing a metal oxide, then a polyester film having the same thickness as the base polyester film was laminated thereon by ordinary dry lamination, and the laminate was subjected to aging at 40° C. for 48 hours. The resulting laminate was cut into a 15 mm wide strip and immersed in hot water of 60° C. for 30 minutes (hot water treatment). An end of the hot water treated test piece was partly separated and the test piece was subjected to T-peel at a rate of 100 mm/min by a peel tester. Adhesion was rated as follows.

○: 100 gf or greater (in load)
Δ: 10 to below 100 gf
×: below 10 gf (4) Adhesive Strength to Hard Coat:

The hard coat surface was cut crosswise to form 1-mm-wide 100 squares and subjected to a 90° peel test (rate of pulling: 2 inches/min). Adhesion was rated according to the following criterion.

○:number of squares which separated≦5
Δ:5<number of squares which separated≦20
>:20<number of squares which separated (5) Heat Ray Cut-Off Performance:

A 100 W incandescent lamp was set at a distance of 50 mm from a test film (300 mm×300 mm) and lit. Immediately and 30 minutes after lighting of the lamp, the back of the examiner's hand was held at a distance of 50 mm from the test film on the opposite side of the lamp, and the heat ray cut-off performance of the test films was evaluated and ranked as follows.

Rank A: Heat ray was scarcely felt. (No problem in practical use)

Rank B: Heat ray was felt slightly. (No problem in practical use)

Rank C: Heat ray was felt strongly. (Problematic in practical use)

The methods of producing the polyester materials used in the following Examples and Comparative Examples are as described below.

<Polyester A> (Dilute PET)

100 parts of dimethyl terephthalate, 60 parts of ethylene glycol and 0.09 part of magnesium acetate tetrahydrate were supplied into a reactor and heated while distilling away methanol to carry out an ester exchange reaction. The mixture was heated to 230° C. taking a period of 4 hours after start of the reaction, at which point the ester exchange reaction was substantially completed. Then 0.04 part of ethyl acid phosphate and 0.04 part of antimony trioxide were added, and the mixture was further heated to 280° C. with pressure reduced to 15 mmHg in 100 minutes. The pressure was gradually reduced successively till finally reaching 0.3 mmHg. 4 hours later, the system was returned to normal pressure to obtain polyester A containing substantially no fine particles. Intrinsic viscosity of this polyester was 0.70.

<Polyester B> (PET Containing Particles)

100 parts of dimethyl terephthalate, 60 parts of ethylene glycol and 0.09 part of magnesium acetate tetrahydrate were supplied into a reactor and heated while distilling away methanol to carry out an ester exchange reaction. The mixture was heated to 230° C. taking a period of 4 hours after start of the reaction, at which point the ester exchange reaction was substantially completed. Then an ethylene glycol slurry containing 2.0 parts of silica particles having an average size (diameter) of 1.4 μm was added to the reaction system, and after further adding 0.04 part of ethyl acid phosphate and 0.04 part of antimony trioxide, the mixture was heated to 280° C. with pressure reduced to 15 mmHg in 100 minutes. Pressure was gradually reduced to finally reach 0.3 mmHg. 4 hours later, the system was returned to normal pressure to obtain polyester B. The silica particle content of the obtained polyester B was 1.0% by weight, and its intrinsic viscosity was 0.70.

<Polyester C> MB Containing 10% of Dye

Polyester A was supplied to a vented double-screw extruder, to which Dia-Resin Red HS, Blue H3G and Yellow F (all products of Mitsubishi Chemical Corporation) were added in admixture to the concentrations of 3.0% by weight, 5.5% by weight and 1.5% by weight, respectively, and the mixture was melted, kneaded and chipped to obtain a dye masterbatch (polyester C).

<Production of ITO Powder>

A mixture of 1.8 parts by weight of an aqueous solution of $InCl_3$ (containing 30% by weight of In metal) and 0.2 part by weight of an aqueous solution of $SnCl_4$ (containing 15% by weight of Sn metal) was added dropwise to 12 parts by weight of an aqueous solution of 25 wt % $NH_4HCO_3$ with stirring under heating at 70° C., making pH of the solution finally 8 and causing precipitation of coprecipitated In—Sn hydroxides. Then the solution was allowed to stand, letting the precipitate settle down, after which the supernatant was removed, ion exchange water was added and the solution was again allowed to stand. After repeating the above operations of precipitation, removal of supernatant and standing 6 times, the precipitate was washed well with water and then suction filtered to obtain a precipitate of a hydrous hydroxide.

Using the thus obtained hydrous hydroxide as starting material, it was subjected to a heat treatment at 350 to 1,000° C. in a closed and pressurized (not lower than 2 $kgf/cm^2$) atmosphere of an inert gas (such as argon, helium or nitrogen) to obtain ITO powder.

<Production of ATO Powder>

A mixture of 1.8 parts by weight of an aqueous solution of $SnCl_4$ (containing 30% by weight of Sn metal) and 0.2 part by weight of an aqueous solution of $SbCl_3$ (containing 30% by weight of Sn metal) was added dropwise to 12 parts by weight of an aqueous solution of 7.5 wt % NaOH with stirring under heating at 90° C., making the final solution pH 7 and causing precipitation of coprecipitated Sn—Sb hydroxides. Then the solution was allowed to stand, letting the precipitate settle down, after which the supernatant was removed, ion exchange water was added and the solution was again allowed to stand. After repeating the above operations of precipitation, removal of the supernatant and standing 6 times, the precipitate was washed well with water and then suction filtered to obtain a precipitate of a hydrous hydroxide.

Using the thus obtained hydrous hydroxide as starting material, it was subjected to a heat treatment at 350 to 1,000° C. in a closed and pressurized (not lower than 2 $kg/cm^2$) atmosphere of an inert gas (such as argon, helium or nitrogen) to obtain ATO powder.

<Preparation of Coating Solution (A)>

The ITO powder obtained in the manner described above was compounded with an acrylic resin, a solvent (xylene/MEK=80/20) and a surfactant and dispersed by a sand mill for 24 hours to obtain a coating solution (A) containing 65% by weight of ITO particles having an average diameter of 0.05 μm.

<Preparation of Coating Solution (B)>

The same procedure as used in the preparation of coating solution (A) was conducted except that ITO powder was replaced by ATO powder to obtain a coating solution (B) containing 65% by weight of ATO particles having an average diameter of 0.05 μm.

<Preparation of Coating Solution (C)>

A coating solution (C) was obtained in the same way as in the preparation of coating solution (A) except that ITO powder was replaced by indium oxide having an average particle diameter of 0.10 μm.

<Preparation of Coating Solution (D)>

A coating solution (D) was obtained in the same way as in the preparation of coating solution (A) except that ITO powder was replaced by zinc oxide particles having an average diameter of 0.27 μm.

<Preparation of Coating Solution (E)>

A coating solution (E) was obtained in the same way as in the preparation of coating solution (A) except that ITO powder was not used.

EXAMPLE 1

<Production of Polyester Film>

Chips of polyester A and polyester C were supplied to an extruder for intermediate layer in an A:C ratio of 92:2 as the intermediate layer resins. Separately from this, chips of polyester A and polyester B were supplied to an extruder for external layers in an A:B ratio of 93.0:7.0 as the external layer resins. Each of the extruders was a vented turning-in-different-direction double-screw extruder. The resins were extruded at the melting temperature of 290° C. without drying, and the molten polymers were joined in the feed block and laminated. The extrudate was cooled and solidified on a cooling drum set to a surface temperature of 40° C. using an electrostatic pinning method to obtain a three-layer laminated non-stretched sheet. This sheet was stretched 3.6 times in the machine direction at 83° C.

Then the film was led into a tenter where the film was dried and preheated, then stretched 3.8 times in the transverse direction and heat set at 225° C. Thereafter, the film was relaxed 5% in the width direction at 185° C., then cooled and wound up to form a roll of biaxially oriented film. The layer thickness profile of this film was 2/21/2 μm, with the overall thickness being 25 μm.

<Production of Resin Layer Containing Metal-added Metal Oxide Particles or Metal Oxide Particles>

Coating solution (A) was coated on the obtained biaxially oriented polyester film by a Mayer bar to have a dry coating thickness of 1.8 μm, and dried at 100° C. to obtain a laminated polyester film.

<Production of Hard Coat>

The above film roll was set in a coater and the side of the film opposite from the side coated with a resin layer containing the metal-added metal oxide particles or the metal oxide particles was coated with a hard coating material of the following composition by a #20 bar and dried at 90° C. for one minute. Then the coating was further dried by a high pressure mercury lamp under the conditions of output=120 w/cm, irradiation distance=15 cm, speed of travel=10 m/min to form a 2 μm hard coat.

Hard Coat Composition:

Acrylic resin (SEIKA-BEAM EXY-26(S) produced by Dainichiseika Color & Chemicals Mfg. Co., Ltd.), 30 parts by weight Methyl ethyl ketone, 35 parts by weight Toluene, 35 parts by weight

EXAMPLES 2–5 AND COMPARATIVE EXAMPLES 1–5

Films of Examples 2–5 and Comparative Examples 1–5 were made in the same way as in Example 1 except that in the polyester production in example 1, the polyester A to copolyester C ratio in the intermediate layer and the coating solution used for forming the resin layer containing the metal-added metal oxide particles or the metal oxide particles were changed as shown in Table 1 below.

In Comparative Example 2, the film was made without providing the coating layer.

TABLE 1

| | A:C ratio in intermediate layer | Dye concentration (wt %) | Type of coating solution |
|---|---|---|---|
| Example 1 | 92:8 | 0.8 | A |
| Example 2 | 92:8 | 0.8 | B |
| Example 3 | 85:15 | 1.5 | A |
| Example 4 | 92:8 | 0.8 | C |
| Example 5 | 92:8 | 0.8 | D |
| Comp. Example 1 | 100:0 | 0 | A |
| Comp. Example 2 | 92:8 | 0.8 | E |

COMPARATIVE EXAMPLE 3

A colored ink was prepared by blending a brown organic pigment (Irgalite Brown B produced by Ciba Geigy Ltd.) as colorant and a mixed solution of ethyl acetate and methyl isobutyl ketone as organic solvent in a mixture of a vinyl chloride-vinyl acetate copolymer and a polyester resin, and this colored ink was coated by a roll coater on one side of the biaxially oriented polyester film obtained in the polyester production in Comparative Example 1 and dried at 80° C. to form a μm colored layer.

On this film were provided a resin layer of coating solution (A) and a hard coat in the same way as in Example 1.

COMPARATIVE EXAMPLE 4

Chips were prepared by blending polyesters A, B and C in the A:B:C ratio of 85:7:8 in the resin for the intermediate layer and the resin for the external layers used in Example 1, and these chips were supplied to both of the extruder for the intermediate layer and the extruder for the external layers. Then, the film forming operations were carried out in the utterly same way as in Example 1 to make a biaxially oriented film. This film was a coextruded single-layer film with an overall thickness of 25 μm.

In the molten sheet making operation in the film forming process, there was observed a phenomenon of the sublimate being gradually deposited on the cooling drum (no such a phenomenon was observed in Example 1), and it was impossible to carry on the production for a long time. The properties of this film are shown in Table 2. Since the same fine particles as used in Example 1 were added in the intermediate layer, too, in the same concentration, the produced film was cloudy with a high haze.

Then, a resin layer of coating solution (A) and a hard coat were provided on the film in the same way as in Example 1.

The results of evaluation of the films obtained in the Examples and the Comparative Examples are shown collectively in Table 2.

TABLE 2

| | Haze (%) | Visible light transmittance (%) | Heat ray cut-off performance | Adhesion to hard coat | Adhesion to vapor deposit layer |
|---|---|---|---|---|---|
| Example 1 | 2.1 | 29 | A | ○ | ○ |
| Example 1 | 2.2 | 29 | A | ○ | ○ |
| Example 1 | 2.1 | 13 | A | ○ | ○ |
| Example 1 | 3.2 | 27 | B | ○ | ○ |
| Example 1 | 5.1 | 20 | A | ○ | Δ |
| Example 1 | 1.6 | 85 | B | ○ | ○ |
| Example 1 | 1.8 | 30 | C | ○ | ○ |
| Comp. Example 1 | 3.2 | 30 | B | X | X |
| Comp. Example 2 | 6.1 | 32 | B | X | X |

INDUSTRIAL APPLICABILITY

According to the present invention, it is possible to provide a film which is free of haze, excels in light screening and heat insulating properties, has no risk of fouling the production machine by sublimation of the dyes, etc., and also shows excellent adhesion to the resin layer containing the metal-added metal oxide particles or the metal oxide particles and to the hard coat, so that its industrial value is high.

What is claimed is:

1. A biaxially oriented laminated polyester film which is a co-extruded laminated polyester film comprising at least three polyester layers whose intermediate layer contains a dye which is substantially dissolved in polyesters, said film having on one side thereof a resin layer containing metal-added metal oxide particles or metal oxide particles, and having on another side thereof a hard coat layer.

2. A biaxially oriented laminated polyester film according to claim 1, wherein the metal-added metal oxide particles are tin-added indium oxide particles or antimony-added tin oxide particles.

3. A biaxially oriented laminated polyester film according to claim 2, wherein the resin layer comprises an active energy ray curable resin layer.

4. A biaxially oriented laminated polyester film according to claim 1 wherein, the metal oxide particles are indium oxide particles or tin oxide particles.

5. A biaxially oriented laminated polyester film according to claim 4, wherein the resin layer comprises an active energy ray curable resin layer.

6. A biaxially oriented laminated polyester film according to claim 1, wherein the resin layer comprises an active energy ray curable resin layer.

7. A biaxially oriented laminated polyester film according to claim 1, which is adapted for application to windows.

* * * * *